Nov. 9, 1948.   E. A. FORCIER   2,453,126

HAND BEADING TOOL

Filed April 12, 1946

Inventor
Eudore A. Forcier

By F. J. Schmitt
Attorney

UNITED STATES PATENT OFFICE 2,453,126

HAND BEADING TOOL

Eudore A. Forcier, United States Navy

Application April 12, 1946, Serial No. 661,637

2 Claims. (Cl. 153—9)

(Granted under the act of March 3, 1883, as amended April 30, 1928; 370 O. G. 757)

This invention is directed to a hand beading tool and particularly to a device to provide a bead on aircraft tubing.

Aircraft, and especially larger aircraft, have a good many feet of tubing, especially tubing made of aluminum alloy materials. These tubes are ordinarily joined by suitable nuts. However, it is customary to slip the nut over the end of the tube then either flange or bead the end of the tube. The present beading tool has been developed to facilitate this beading operation wherever a bead in tubing is required.

An object of this invention is to provide a suitable beading tool which can perform the beading operation without requiring removal of the tubing from installation.

Another object is to provide a bead forming device which has general utility and can be used to place a bead on a tube wherever desired.

Details of the invention are described in connection with the following drawings in which Figure 1 is a plan view of the beading tool.

Figure 4:
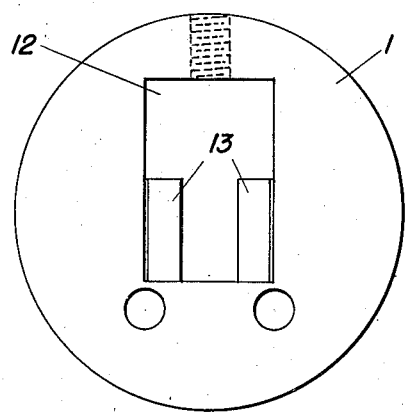
Figure 4 is a plan view of the beading tool housing.

The drawings show the beading tool assembly. Beading tool housing 1 as shown in Figure 4, is preferably a circular plate member although the particular shape is not essential. Housing 1 is provided with rectangular opening 12 having ribs 13 extending for a partial length along the sides of the opening for a purpose later described.

Figure 3:
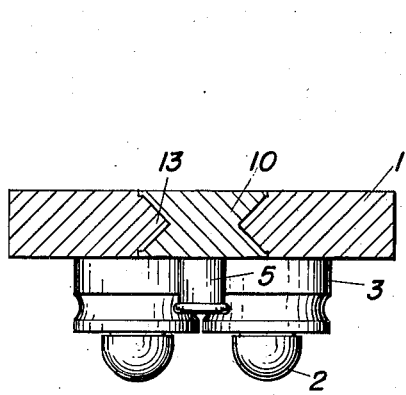
Figure 3 is a sectional view on line 3—3 of Figure 1.

Bead roller block 10 is provided with grooves along its side edges corresponding in shape to that of ribs 13. Block 10 is inserted in opening 12 and is of such size that with slight movement in opening 12 the grooves engage ribs 13 as shown in Figure 3. Ribs are of a length which will permit insertion of block 10 in opening 12.

Figure 1:
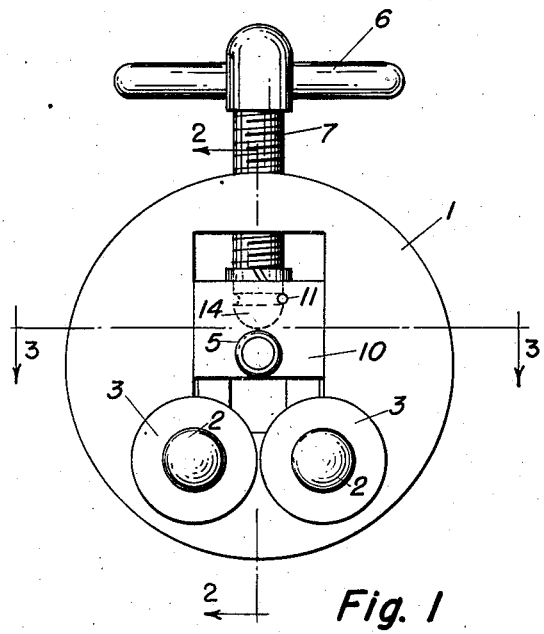
Figure 2:
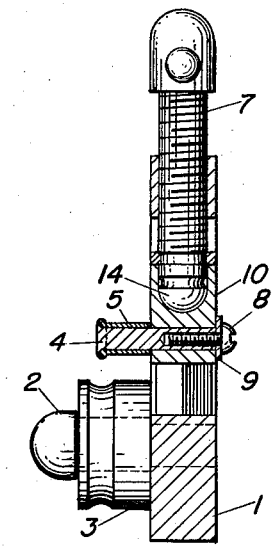
Figure 2 is a section on line 2—2 of Figure 1.

Movement of block 10 within opening 12 results by operation of block feed screw 7 which extends through a threaded bore in housing 1 and is seated in an aligned socket in block 10. Screw 7 is provided with a ball 14 at its end which fits into the socket and is locked in place by means of pin 11 or in any other suitable manner. As shown in Figure 1, pin 11 is driven through a suitable perforation in block 10 and engages the neck or ball 14 thereby insuring retention of ball 14 within block 10. Handles 6 on the opposite end of the screw permits rotation of the screw and results in corresponding movement of block 10 within opening 12.

Two anvil rollers 3 provided with peripheral grooves are rotatably secured to housing 1 by means of shoulder pins 2. The shoulders on pins 2 permit a slight clearance of the pin head above its corresponding roller so as not to resist roller rotation. Rollers 3 are positioned in contiguous slightly spaced relationship as shown in Figure 3.

Tubular bead member 5 is secured to block 10 as shown by means of countersunk pin 4. Screw 8 and washer 9 maintain pin 4 in place. The bead on tubular member 5 is spaced above block 10 the required distance to become aligned with the peripheral grooves in rollers 3 as clearly shown in Figure 3. It will be apparent that rotation of screw 7 forces the bead member 5 into close proximity to the anvil rollers 3 with the bead in member 5 in operative relationship with the peripheral grooves in rollers 3.

In operation, the tube to be beaded is placed over bead member 5 in telescopic relationship. It will be apparent that this relationship is relative and that the bead member 5 might be inserted within the tube to be beaded where the beading is to be performed at the tube installation. Bead member 5 is then forced into cooperative relationship with anvil rollers 3 by rotation of screw 7 and worked around the periphery of the tube thereby forming a bead.

Spacing and size of bead is determined by proper selection of beading member and anvil rollers. Change of bead member makes it possible to accommodate tubing as small as ¼ inch in diameter.

Even though intended to apply a bead on tubing in aircraft installations, it will be apparent that the present tool can be used on any flexible sheet tubing wherever desired. In fact one could readily telescope the tube over one of the anvil rollers thereby forming a concave bead instead of the convex bead formed when the tube telescopes bead member 5.

The invention described herein may be manufactured and used by or for the Government of the United States of America for governmental purposes without the payment of any royalties thereon or therefor.

What is claimed is:

1. A beading tool comprising a housing plate provided with an opening therein, a block slidably mounted in said opening, a pair of grooved anvil rollers mounted on said housing in contiguous relationship and symmetrically disposed with respect to said opening, said rollers extending laterally and unobstructedly from the face of the housing for the reception of work to be beaded, a bead member mounted on said block, and means for urging said bead member into operative relationship with respect to said anvil rollers.

2. A beading tool comprising a housing plate, a rectangular opening in said plates, guide ribs along the sides of said opening, a block slidable on said guide ribs, a grooved anvil roller mounted on opposite sides of said housing plate in contiguous relationship to each other, said rollers extending laterally and unobstructedly from the face of the housing for the reception of work to be beaded, a bead forming member mounted on said block, and means for urging said block and bead into operative relationship with respect to said anvil rollers.

EUDORE A. FORCIER.

REFERENCES CITED

The following references are of record in the file of this patent:

UNITED STATES PATENTS

| Number | Name | Date |
|---|---|---|
| 1,724,920 | Fischer | Aug. 20, 1929 |
| 2,085,710 | Tornblom et al. | June 29, 1937 |